United States Patent
Zhang et al.

(10) Patent No.: US 10,168,568 B2
(45) Date of Patent: Jan. 1, 2019

(54) DISPLAY DEVICE

(71) Applicants: Boe Technology Group Co., Ltd., Beijing (CN); Hefei Xinsheng Optoelectronics Technology Co., Ltd., Anhui (CN)

(72) Inventors: Qing Zhang, Beijing (CN); Wei Yan, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 14/779,393

(22) PCT Filed: Apr. 17, 2015

(86) PCT No.: PCT/CN2015/076836
§ 371 (c)(1),
(2) Date: Sep. 23, 2015

(87) PCT Pub. No.: WO2016/062041
PCT Pub. Date: Apr. 28, 2016

(65) Prior Publication Data
US 2016/0327831 A1    Nov. 10, 2016

(30) Foreign Application Priority Data
Oct. 21, 2014 (CN) .......................... 2014 1 0562602

(51) Int. Cl.
*G02F 1/1335* (2006.01)
*G02F 1/1333* (2006.01)

(52) U.S. Cl.
CPC .... *G02F 1/133502* (2013.01); *G02F 1/13338* (2013.01); *G02F 1/133504* (2013.01); *G02F 1/133528* (2013.01)

(58) Field of Classification Search
None
See application file for complete search history.

(56) References Cited

U.S. PATENT DOCUMENTS 7,030,944 B2 * 4/2006 Fujimoto .......... G02F 1/133528
349/112
2002/0122257 A1 * 9/2002 Suga ...................... G02B 1/105
359/580

(Continued)

FOREIGN PATENT DOCUMENTS

CN     1248712    3/2000
CN     1721941    1/2006

(Continued)

OTHER PUBLICATIONS

International Search Report and Written Opinion from PCT/CN15/76836 dated Jul. 8, 2015.

(Continued)

*Primary Examiner* — Edward Glick
*Assistant Examiner* — Anthony G Quash
(74) *Attorney, Agent, or Firm* — Calfee, Halter & Griswold LLP

(57) ABSTRACT

The present disclosure provides a display device comprising a display panel, wherein a first polarizer is arranged at a side of the display panel that is opposite to the side for displaying images, and a functional component with a grid structure and a second polarizer are arranged in sequence along the direction away from the display panel at the side for displaying images, the second polarizer being capable of scattering light rays that penetrate the second polarizer.

10 Claims, 2 Drawing Sheets

(56) References Cited

U.S. PATENT DOCUMENTS

| | | | | |
|---|---|---|---|---|
| 2005/0185122 | A1* | 8/2005 | Edelbrock | H04N 13/0409 349/115 |
| 2006/0215079 | A1* | 9/2006 | Suzuki | G02F 1/133502 349/96 |
| 2008/0055523 | A1* | 3/2008 | Nishihara | G02F 1/133504 349/96 |
| 2008/0186418 | A1 | 8/2008 | Kim et al. | |
| 2014/0049699 | A1* | 2/2014 | Huang | G02B 5/3016 349/12 |
| 2014/0127465 | A1* | 5/2014 | Shim | G02B 1/111 428/147 |

FOREIGN PATENT DOCUMENTS

| | | |
|---|---|---|
| CN | 101533166 | 9/2009 |
| CN | 101650447 | 2/2010 |
| CN | 102057317 | 5/2011 |
| CN | 102629167 | 8/2012 |
| CN | 202534373 | 11/2012 |
| CN | 202623390 | 12/2012 |
| CN | 202632793 | 12/2012 |
| CN | 202632794 | 12/2012 |
| CN | 103377748 | 10/2013 |
| CN | 103466958 | 12/2013 |
| CN | 103951281 | 7/2014 |
| CN | 104297988 | 1/2015 |

OTHER PUBLICATIONS

Office action from Chinese Application No. 201410562602.6 dated Oct. 28, 2016.

Office Action from China Application No. 201410562602.6 dated Jan. 5, 2017.

Office action from Chinese Application No. 201410562602.6 dated Aug. 19, 2016.

* cited by examiner

DISPLAY DEVICE

RELATED APPLICATIONS

This application is the U.S. national phase entry of PCT/CN15/076836, filed Apr. 17, 2015, which claims priority to Chinese Application No. 201410562602, filed Oct. 21, 2014, the entire disclosures of which are incorporated herein by reference.

FIELD

The present disclosure relates to the technical field of liquid crystal display technologies and, in particular, to a display device.

BACKGROUND

A display device generally includes a display panel and other functional components for carrying out respective functions. These functional components generally include a touch module for carrying out touch control, a 3D display module for carrying out 3D display, and so on. Such functional components will inevitably affect the images displayed by the display panel when carrying out the other functions. For example, if the functional component is provided with a grid structure, it will affect the images displayed by the display panel negatively.

How the grid structure of a functional component affects the display negatively is described below using the example of a display device with a touch module. As shown in FIG. 1, a display device 1 comprises a frame 100 as well as a backlight 14, a first polarizer 11, an array substrate 15, a liquid crystal layer 16, a color film substrate 17, a second polarizer 13 and a touch module, arranged from inside out along the frame 100. The touch module comprises a protective glass 12 and a touch sensing electrode (manufactured on the protective glass 12, not shown in the figure). Therein, the backlight 14 provides light rays which are emitted towards the first polarizer 11, a display panel formed by the array substrate 15, the liquid crystal layer 16 and the color film substrate 17, and the second polarizer 13 in sequence, thereby realizing display. The touch sensing electrode is a metal grid structure manufactured on the protective glass 12, as shown in FIG. 2, which is used for identifying a touched position when a user touches upon any region on the protective glass 12; the second polarizer 13 is attached with the protective glass 12 via an attaching adhesive 101. In the above display device 1, the first polarizer 11 and the second polarizer 13 are glare polarizers, as a glare polarizer provides for sufficient attachment fastness so as to satisfy the requirements for such attachment fastness between the first polarizer 11 and the array substrate 15, and between the second polarizer 13 and the color film substrate 17 and the protective glass 12.

In the above display device 1, the metal grid structure of the touch sensing electrode will generate interference with the pixels of the display panel, leading to the occurrence of Moiré patterns in the images displayed by the display device 1, as shown in FIG. 3, and resultantly affecting the display effect.

SUMMARY

The present disclosure is intended to at least solve one of the technical problems in the prior art, and proposes a display device in which a second polarizer is arranged externally to the functional component of a protective glass such that the second polarizer can be provided as an anti-glare polarizer capable of scattering light rays that penetrate the second polarizer, which thus enables the second polarizer to atomize the displayed images to some degree, and eliminate the Moiré patterns caused by the interference between the pixels of the display panel and the grid structure of the functional component such as a touch electrode.

In order to achieve the object of the present disclosure, a display device is provided, which comprises a display panel, wherein a first polarizer is arranged at a side of the display panel that is opposite to the side for displaying images, and a functional component and a second polarizer are arranged in sequence along the direction away from the display panel at the side for displaying images, wherein the functional component has a grid structure, and the second polarizer is capable of scattering light rays that penetrate the second polarizer.

Therein, the functional component may comprise a protective glass and a touch module consisting of a touch sensing electrode arranged on the protective glass.

Therein, the functional component may be a 3D display module.

Therein, the second polarizer may comprise a base and an anti-glare layer arranged on the base.

Therein, the anti-glare layer may have a thickness ranging from 6.4 μm to 18 μm.

Therein, the anti-glare layer may be a resin layer arranged with inner scattering particles.

Therein, the scattering particles may have a particle diameter ranging from 2.4 μm to 6 μm.

Therein, the scattering particles may be polymetric hollow microspheres.

Therein, the scattering particles may be made of acrylate copolymer or styrene copolymer.

Therein, the anti-glare layer may be provided with concave-convex microstructures on a surface thereof away from the base.

Therein, the touch sensing electrode may be arranged at a side of the protective glass facing the display panel.

Therein, the touch sensing electrode may be arranged on a support layer, and the support layer is attached to the side of the protective glass facing the display panel.

The present disclosure has the following advantageous effects:

The display device provided by the present disclosure has the second polarizer arranged externally to the functional component such that the second polarizer can be provided as an anti-glare polarizer capable of scattering light rays that penetrate the second polarizer, and the anti-glare polarizer can cause certain degree of atomization of the displayed images of the display device, which atomization may reduce the Moiré patterns caused by the interference between the pixels of the display panel and the grid structure of the functional component, thus eliminate the Moiré patterns in the display images, and improve the display effect of the display device; additionally, the atomization of the displayed images by the second polarizer may also eliminate the shadows formed under irradiation by light rays due to different reflectivities of the respective areas in the pattern of the grid structure of the functional component, thereby further improving the display effect of the display device.

BRIEF DESCRIPTION OF DRAWINGS

The drawings are used for providing further understanding of the present disclosure and constitutes a part of the description. They are used for illustrating the present disclosure along with the following embodiments, but do not constitute any limitation to the present disclosure.

In the drawings.

DETAILED DESCRIPTION

The embodiments of the present disclosure are illustrated below in detail in conjunction with the drawings. It should be understood that the embodiments as described herein are used only for illustrating and explaining the present disclosure, rather than for limiting the present disclosure.

Figure 1:
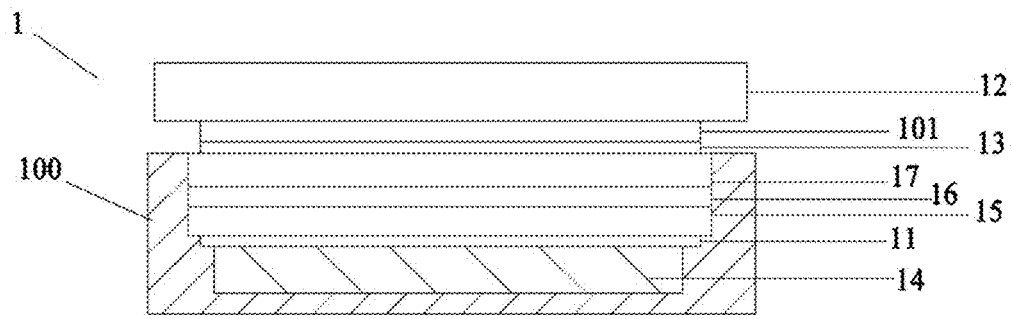
FIG. 1 is a schematic diagram of a prior art display device comprising a touch module.
Figure 2:
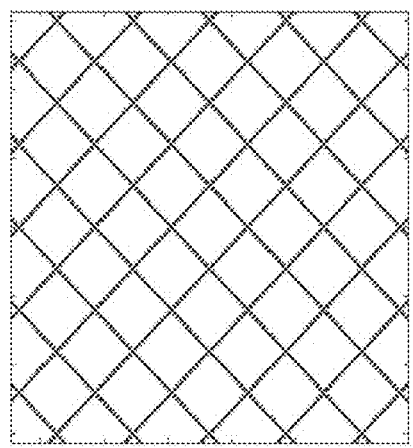
FIG. 2 is a schematic diagram of a touching sensing electrode in the display device shown in FIG. 1.
Figure 3:
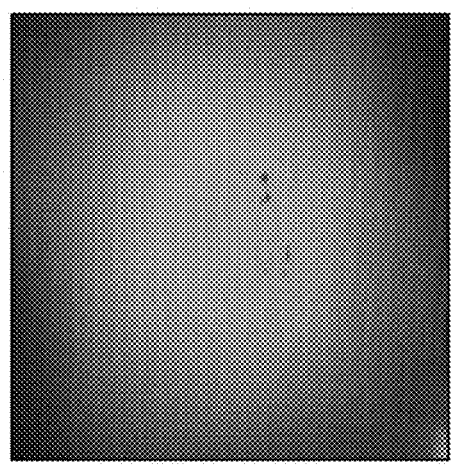
FIG. 3 is a schematic diagram of the Moiré patterns generated in the display device shown in FIG. 1.
Figure 4:
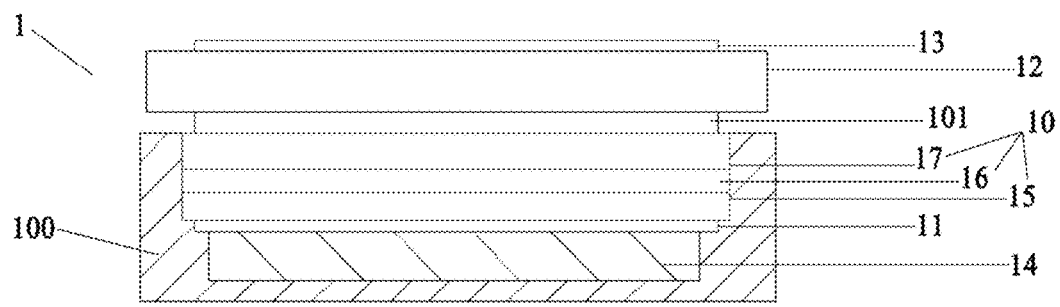
FIG. 4 is a schematic diagram of an embodiment of a display device provided by the present disclosure.

Referring to FIG. 4, FIG. 4 is a schematic diagram of an embodiment of a display device provided by the present disclosure. The display device 1 comprises a display panel 10, a first polarizer 11 arranged at a side of the display panel 10 that is opposite to the side for displaying images, as well as a functional component with grid structure and a second polarizer 13 that are arranged in sequence at the side for displaying images, wherein the second polarizer 13 is capable of scattering light rays that penetrate the second polarizer 13, i.e. the second polarizer 13 is an anti-glare polarizer. Specifically, the display panel 10 comprises a color film substrate 17, a liquid crystal layer 16 and an array substrate 15 arranged in sequence along the direction away from the functional component. Additionally, the display device 1 further comprises a backlight 14 for providing light rays emitted towards the display panel 10. The light rays pass through the first polarizer 11 for emission towards the display panel 10 in which light rays penetrate the array substrate 15, the liquid crystal layer 16 and the color film substrate 17 in sequence. Then the light rays pass through the functional component and the second polarizer 13 before emitted outward therefrom, thus implementing the display of the display device 1.

In this embodiment, the second polarizer 13 is arranged externally to the functional component, i.e. the second polarizer 13 is located at the outmost side of the display device 1 (a side where light rays exit from the display device). In this case, one side of the second polarizer 13 can be attached to the functional component, while the other side needs not to be attached with any components. Therefore, the second polarizer 13 can be provided as an anti-glare polarizer capable of scattering light rays that penetrate the second polarizer 13. While, in a prior art technical solution where the second polarizer 13 is arranged on the color film substrate 17 (one side of the second polarizer 13 needs to be attached to the color film substrate 17, and the other side needs to be attached to the functional component facing this side of the second polarizer 13), since an anti-glare polarizer provides a relatively poor attachment fastness that is unable to satisfy the requirement for an attachment fastness between the second polarizer 13 and the color film substrate 17 and the functional component, the second polarizer 13 in this prior art technical solution where the second polarizer 13 is arranged on the color film substrate 17 cannot be provided as an anti-glare polarizer. In the present embodiment, when light rays are emitted from the display panel 10 located at one side of a functional component towards the second polarizer 13 located at the other side of the functional component, the second polarizer 13 may scatter light rays that penetrate the second polarizer 13, such that certain atomization is generated in the displayed images of the display device 1, which atomization can reduce the Moiré patterns caused by the interference between the pixels of the display panel 10 and the grid structure of the functional component, thereby improving the display effect of the display device 1. Additionally, the atomization of the displayed images by the second polarizer 13 can also eliminate the shadows formed under irradiation by light rays (by light rays emitted from the backlight 14 towards the display panel 10) due to different reflectivities of the respective areas (e.g. areas corresponding to the grid lines and areas between the grid lines) in the pattern of the grid structure of the functional component, thereby further improving the display effect of the display device 1.

Specifically, the functional component can be a component for implementing a particular function other than the basic display function in the display device, for example, a touch module for carrying out touch control, a grating 3D display module for carrying out 3D display, and so on. To take a touch module as the functional component for example, it comprises a protective glass 12 and a touch sensing electrode arranged on the protective glass 12, wherein the touch sensing electrode can be arranged at a side of the protective glass 12 facing the display panel 10. Alternatively, in other embodiments, the touch sensing electrode can be arranged within the display panel 10, or arranged on a substrate located between the display panel 10 and the protective glass 12. The protective glass 12 is located externally to the display panel 10 and the touch sensing electrode, for protecting the display panel 10 and the touch sensing electrode from damages.

Figure 5:
FIG. 5 is a schematic diagram of a second polarizer in the display device shown in FIG. 4.

Specifically, the second polarizer 13 comprises a base 130 and an anti-glare layer 131 arranged on the base 130, as shown in FIG. 5. The base 130 is used for polarization and the anti-glare layer 131 is used for scattering light rays that penetrate the second polarizer 13. Optionally, the anti-glare layer 131 is a resin layer arranged with inner scattering particles. The anti-glare layer 131 has a thickness ranging from 6.4 μm to 18 μm. The scattering particles can be polymetric hollow microspheres, which are made of acrylate copolymer or styrene copolymer and have a particle diameter ranging from 2.4 μm to 6 μm. The scattering particles arranged in the resin layer can scatter around light rays emitted towards it, such that the anti-glare layer 131 can cause atomization of the displayed images of the display device 1 and reduce the Moiré patterns caused by the interference between the pixels of the display panel 10 and the touch sensing electrode. Further optionally, the anti-glare layer 131 is provided with concave-convex microstructures on a surface thereof away from the base 130, by which the light rays can be further scattered.

Figure 6:
FIG. 6 is a schematic diagram of a touching sensing electrode arranged directly on a protective glass.
Figure 7:
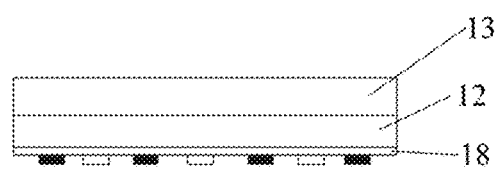
FIG. 7 is a schematic diagram of the touch sensing electrode arranged above a support layer.

In this embodiment, optionally, the touch sensing electrode is arranged at a side of the protective glass 12 facing the display panel 10. Specifically, as shown in FIG. 6, the touch sensing electrode can be directly manufactured on the side of the protective glass 12 facing the display panel 10; alternatively, as shown in FIG. 7, the touch sensing electrode can also be manufactured on a support layer 18, and then the support layer 18 is attached to the side of the protective glass 12 facing the display panel 10.

The display device 1 provided by the present disclosure has the second polarizer 13 arranged externally to the protective glass 12 such that the second polarizer 13 can be provided as an anti-glare polarizer capable of scattering light rays that penetrate the second polarizer 13, and the anti-glare polarizer can cause certain degree of atomization of the displayed images of the display device 1, which atomization can reduce the Moiré patterns caused by the interference between the pixels of the display panel 10 and the grid structure of the functional component, thus eliminate the Moiré patterns in the display images, and improve the display effect of the display device 1; additionally, the atomization of the displayed images by the second polarizer 13 can also eliminate the shadows formed under irradiation by light rays due to different reflectivities of the respective areas in the pattern of the grid structure of the functional component, thereby further improving the display effect of the display device 1.

It can be understood that the above embodiments are only exemplary embodiments for illustrating the principle of the present disclosure, and the present disclosure is not limited to these embodiments. For those ordinarily skilled in the art, various variations and modifications can be made without departing from the spirit and essence of the present disclosure, and these variations and modifications are also regarded to fall within the scope of the present disclosure.

What is claimed is:

1. A display device comprising:
    a display panel having a first side for displaying images;
    a first polarizer arranged at a second side of the display panel that is opposite the first side for displaying images;
    a functional component with a grid structure arranged at the first side of the display panel, wherein the functional component comprises a protective glass and a touch module comprising a touch sensing electrode arranged on the protective glass; and
    a second polarizer arranged at a side of the functional component away from the display panel, the second polarizer being configured to scatter light rays that penetrate the second polarizer to reduce Moiré profiling caused by interference between the display panel and the grid structure of the functional component;
    wherein the second polarizer comprises a base and an anti-glare layer arranged on the base, the anti-glare layer is a resin layer including inner scattering particles and the scattering particles are polymetric hollow microspheres.

2. The display device according to claim 1, wherein the anti-glare layer has a thickness ranging from 6.4 μm to 18 μm.

3. The display device according to claim 2, wherein the anti-glare layer is provided with concave-convex microstructures on a surface thereof away from the base.

4. The display device according to claim 1, wherein the scattering particles have a particle diameter ranging from 2.4 μm to 6 μm.

5. The display device according to claim 4, wherein the anti-glare layer is provided with concave-convex microstructures on a surface of the anti-glare layer disposed away from the base.

6. The display device according to claim 1, wherein the scattering particles are made of at least one of acrylate copolymer and styrene copolymer.

7. The display device according to claim 6, wherein the anti-glare layer is provided with concave-convex microstructures on a surface of the anti-glare layer disposed away from the base.

8. The display device according to claim 1, wherein the anti-glare layer is provided with concave-convex microstructures on a surface of the anti-glare layer disposed away from the base.

9. The display device according to claim 1, wherein the touch sensing electrode is arranged at a side of the protective glass facing the display panel.

10. The display device according to claim 1, wherein the touch sensing electrode is arranged on a support layer, and the support layer is attached to the side of the protective glass facing the display panel.

* * * * *